US008880786B2

(12) United States Patent
Guy et al.

(10) Patent No.: US 8,880,786 B2
(45) Date of Patent: Nov. 4, 2014

(54) FLASH TRANSLATION LAYER (FTL) DATABASE JOURNALING SCHEMES

(71) Applicant: Apple Inc., Cupertino, CA (US)

(72) Inventors: Roman Guy, Ashkelon (IL); Eran Sandel, Holon (IL); Elad Harush, Tel Aviv (IL); Yair Schwartz, Yokneam Ilit (IL)

(73) Assignee: Apple Inc., Cupertino, CA (US)

( * ) Notice: Subject to any disclaimer, the term of this patent is extended or adjusted under 35 U.S.C. 154(b) by 232 days.

(21) Appl. No.: 13/630,176

(22) Filed: Sep. 28, 2012

(65) Prior Publication Data

US 2014/0095765 A1  Apr. 3, 2014

(51) Int. Cl.
  *G06F 12/00*  (2006.01)
  *G06F 11/14*  (2006.01)
  *G06F 12/02*  (2006.01)
(52) U.S. Cl.
  CPC ........ *G06F 11/1441* (2013.01); *G06F 11/1458* (2013.01); *G06F 11/1471* (2013.01); *G06F 12/0246* (2013.01)
  USPC .................................. 711/103; 711/E12.008
(58) Field of Classification Search
  None
  See application file for complete search history.

(56) References Cited

U.S. PATENT DOCUMENTS

| 7,836,029 | B2 | 11/2010 | Shoens |
| 8,060,468 | B2 * | 11/2011 | Deguchi et al. ............... 707/610 |
| 8,631,209 | B2 * | 1/2014 | Serlet et al. .................. 711/142 |
| 2008/0243946 | A1 * | 10/2008 | Deguchi et al. ............... 707/202 |
| 2010/0030999 | A1 | 2/2010 | Hinz |
| 2010/0138592 | A1 | 6/2010 | Cheon |
| 2010/0211851 | A1 | 8/2010 | Dixon |
| 2010/0241790 | A1 | 9/2010 | Whang et al. |
| 2013/0198462 | A1 * | 8/2013 | Serlet et al. .................. 711/142 |

OTHER PUBLICATIONS

International Search Report and Written Opinion from PCT/US2013/059375, mailed Feb. 6, 2014, Apple Inc., pp. 1-11.

* cited by examiner

*Primary Examiner* — Kevin Verbrugge
(74) *Attorney, Agent, or Firm* — Meyertons, Hood, Kivlin, Kowert & Goetzel, P.C.

(57) ABSTRACT

A method includes, in a storage device that includes a non-volatile memory and a volatile memory, maintaining at least one data structure that stores management information used for managing data storage in the non-volatile memory, such that at least a portion of the data structure is stored in the volatile memory. A sequence of journaling chunks is created during operation of the storage device, each journaling chunk including a respective slice of the data structure and one or more changes that occurred in the data structure since a previous journaling chunk in the sequence. The sequence of the journaling chunks is stored in the non-volatile memory. Upon recovering from an electrical power interruption in the storage device, the data structure is reconstructed using the stored journaling chunks.

20 Claims, 3 Drawing Sheets

FLASH TRANSLATION LAYER (FTL) DATABASE JOURNALING SCHEMES

FIELD OF THE INVENTION

The present invention relates generally to data storage, and particularly to methods and systems for journaling in non-volatile storage devices.

BACKGROUND OF THE INVENTION

Various memory systems use non-volatile memory, such as Flash memory, for storing data. Flash memory devices are typically managed by a management layer referred to as Flash Management or Flash Translation Layer (FTL). Among other tasks, the FTL typically manages the operation of the Flash memory before and after electrical power interruptions.

SUMMARY OF THE INVENTION

An embodiment of the present invention that is described herein provides a method in a storage device that includes a non-volatile memory and a volatile memory. The method includes maintaining at least one data structure that stores management information used for managing data storage in the non-volatile memory, such that at least a portion of the data structure is stored in the volatile memory. A sequence of journaling chunks is created during operation of the storage device, each journaling chunk including a respective slice of the data structure and one or more changes that occurred in the data structure since a previous journaling chunk in the sequence. The sequence of the journaling chunks is stored in the non-volatile memory. Upon recovering from an electrical power interruption in the storage device, the data structure is reconstructed using the stored journaling chunks.

In some embodiments, the data structure includes a mapping of logical addresses to respective physical storage locations in the non-volatile memory. Additionally or alternatively, the data structure includes a database of parameters of respective memory blocks of the non-volatile memory.

In a disclosed embodiment, creating the sequence of the journaling chunks includes accumulating the changes, and, when the accumulated changes reach a predefined data size, storing the journaling chunk including the accumulated changes and the slice of the data structure. In an embodiment, creating the sequence of the journaling chunks includes including in the changes stored in a given journaling chunk at least one change that does not relate to the slice of the data structure stored in the given journaling chunk.

In another embodiment, creating the sequence of the journaling chunks includes storing in successive journaling chunks respective successive slices that cyclically scan the data structure. In yet another embodiment, creating the sequence of the journaling chunks includes storing in each journaling chunk an indication that points to a respective location in the data structure from which the respective slice was obtained.

In yet another embodiment, the at least one data structure includes multiple data structures, and each journaling chunk includes respective slices of the multiple data structures. In still another embodiment, reconstructing the data structure includes identifying a last journaling chunk that was written most recently to the non-volatile memory before the power interruption, identifying a first journaling chunk including a first valid slice of the data structure, and recovering the journaling chunks from the non-volatile memory, from the identified first journaling slice until the identified last journaling chunk. Recovering the journaling chunks may include applying a given change read from a given journaling chunk only upon verifying that the slice referred to by the given change has been recovered already.

There is additionally provided, in accordance with an embodiment of the present invention, a storage device including a non-volatile memory, a volatile memory and a processor. The processor is configured to maintain at least one data structure that stores management information used for managing data storage in the non-volatile memory, such that at least a portion of the data structure is stored in the volatile memory, to create, during operation of the storage device, a sequence of journaling chunks, each journaling chunk including a respective slice of the data structure and one or more changes that occurred in the data structure since a previous journaling chunk in the sequence, to store the sequence of the journaling chunks in the non-volatile memory, and, upon recovering from an electrical power interruption in the storage device, to reconstruct the data structure using the stored journaling chunks.

The present invention will be more fully understood from the following detailed description of the embodiments thereof, taken together with the drawings in which:

DETAILED DESCRIPTION OF EMBODIMENTS

Overview

Figure 1:
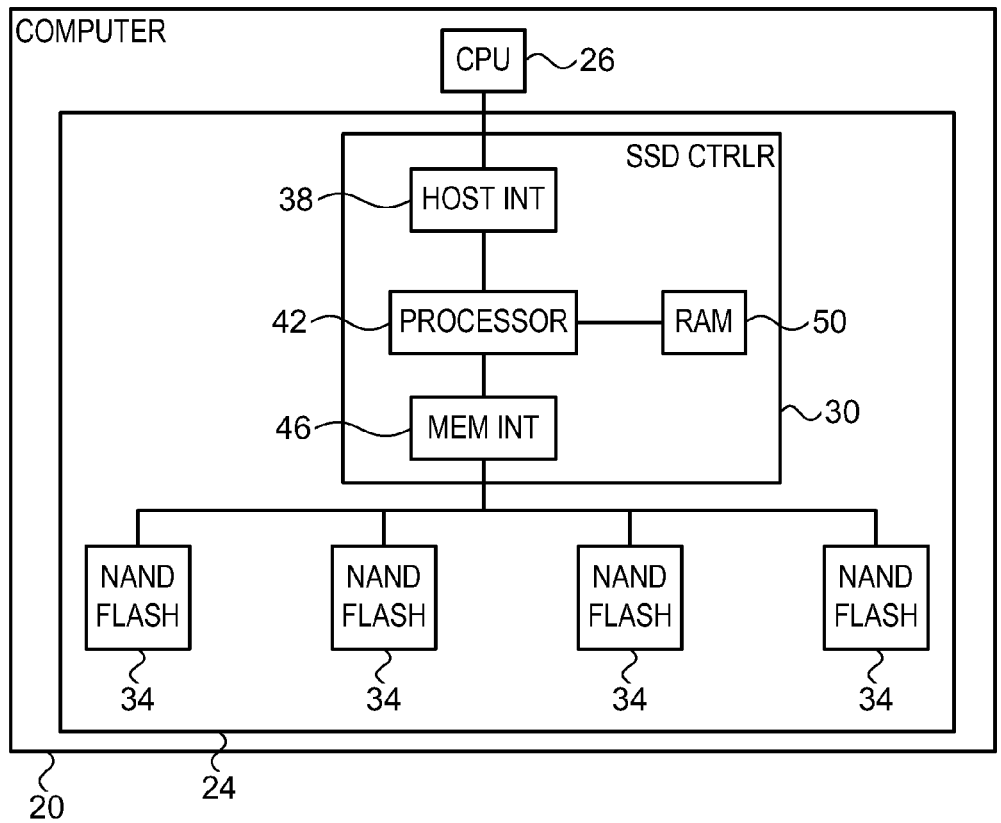
FIG. 1 is a block diagram that schematically illustrates a memory system, in accordance with an embodiment of the present invention.

Embodiments of the present invention that are described herein provide improved methods and systems for protection against electrical power interruptions in non-volatile storage devices.

In some embodiments, a storage device comprises a non-volatile memory such as a NAND Flash memory, and a processor that manages data storage in the non-volatile memory. The processor maintains at least one data structure that stores management information used for data storage in the non-volatile memory. The data structure may comprise, for example, a logical-to-physical address translation table and/or a memory block parameter database.

At least part of the data structure is stored in a volatile memory, such as a Random Access Memory (RAM) of the storage device. As such, the data structure should be protected against electrical power interruption. In some embodiments that are described herein, the processor protects the data structure by applying a periodic journaling scheme.

In a typical implementation, the processor divides the data structure into a large number of successive slices. During operation of the storage device, the processor gradually accumulates the changes that occur in the data structure. When the accumulated changes reach a predefined data size, the processor creates a "journaling chunk," which comprises the changes that occurred since the previous journaling chunk, and also comprises the next slice of the data structure. The processor then stores the journaling chunk in the non-volatile memory.

In other words, the processor continuously creates and stores a sequence of journaling chunks, such that each chunk comprises a respective slice of the data structure plus the changes that occurred in the data structure since the previous chunk. The changes stored in a given chunk, however, may relate to the entire data structure, not necessarily to the individual slice stored in the given chunk.

The sequence of journaling chunks enables the processor to reconstruct the data structure in the event of power interruption. An example recovery scheme is described further below.

Since the processor backs-up the data structure and the changes in small chunks rather than in bulk, the disclosed journaling scheme causes little or no degradation in storage performance. Moreover, this scheme enables the processor to reconstruct the data structure with high speed following power interruption.

Since the slices of the data structures are backed-up at frequent intervals, the number of changes that need to be backed-up is relatively small. Consequently, only a small number of changes need to be applied during recovery. This feature also reduces the number of changes that have not yet been backed-up to the non-volatile memory at any given time, i.e., the changes that will be lost due to the power interruption.

Moreover, the flexibility in choosing the chunk size and the sizes of individual fields in the chunk allows tuning the journaling scheme to any desired trade-off between runtime storage performance and recovery time. The rate at which the processor stores the journaling chunks is typically variable and depends on the level of activity: During intensive storage, changes accumulate rapidly, the journaling chunks fill quickly, and the journaling rate is high. During idle times, changes accumulate slowly and the journaling rate decreases accordingly.

System Description

FIG. 1 is a block diagram that schematically illustrates a memory system, in accordance with an embodiment of the present invention. In the present example, the memory system comprises a computer 20 that stores data in a Solid state Drive (SSD) 24. Computer 20 may comprise, for example, a mobile, tablet or personal computer. The computer comprises a Central Processing Unit (CPU) 26 that serves as a host.

In alternative embodiments, the host may comprise any other suitable processor or controller, and the storage device may comprise any other suitable device. For example, the host may comprise a storage controller of an enterprise storage system, and the storage device may comprise an SSD or an array of SSDs. Other examples of hosts that store data in non-volatile storage devices comprise mobile phones, digital cameras, media players and removable memory cards or devices.

SSD 24 stores data for CPU 26 in a non-volatile memory, in the present example in one or more NAND Flash memory devices 34. In alternative embodiments, the non-volatile memory in SSD 24 may comprise any other suitable type of non-volatile memory, such as, for example, NOR Flash, Charge Trap Flash (CTF), Phase Change RAM (PRAM), Magnetoresistive RAM (MRAM) or Ferroelectric RAM (Fe-RAM).

An SSD controller 30 performs the various storage and management tasks of the SSD. The SSD controller is also referred to generally as a memory controller. SSD controller 30 comprises a host interface 38 for communicating with CPU 26, a memory interface 46 for communicating with Flash devices 34, and a processor 42 that carries out the various processing tasks of the SSD.

SSD 24 further comprises a volatile memory, in the present example a Random Access Memory (RAM) 50. In the embodiment of FIG. 1 RAM 50 is shown as part of SSD controller 30, although the RAM may alternatively be separate from the SSD controller. RAM 50 may comprise, for example a Static RAM (SRAM), a Dynamic RAM (DRAM), a combination of the two RAM types, or any other suitable type of volatile memory.

SSD controller 30, and in particular processor 42, may be implemented in hardware. Alternatively, the SSD controller may comprise a microprocessor that runs suitable software, or a combination of hardware and software elements.

The configuration of FIG. 1 is an exemplary configuration, which is shown purely for the sake of conceptual clarity. Any other suitable SSD or other memory system configuration can also be used. Elements that are not necessary for understanding the principles of the present invention, such as various interfaces, addressing circuits, timing and sequencing circuits and debugging circuits, have been omitted from the figure for clarity. In some applications, e.g., non-SSD applications, the functions of SSD controller 30 are carried out by a suitable memory controller.

In the exemplary system configuration shown in FIG. 1, memory devices 34 and SSD controller 30 are implemented as separate Integrated Circuits (ICs). In alternative embodiments, however, the memory devices and the SSD controller may be integrated on separate semiconductor dies in a single Multi-Chip Package (MCP) or System on Chip (SoC), and may be interconnected by an internal bus. Further alternatively, some or all of the SSD controller circuitry may reside on the same die on which one or more of memory devices 34 are disposed. Further alternatively, some or all of the functionality of SSD controller 30 can be implemented in software and carried out by CPU 26 or other processor in the computer. In some embodiments, CPU 26 and SSD controller 30 may be fabricated on the same die, or on separate dies in the same device package.

In some embodiments, processor 42 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In some embodiments, processor 42 of SSD controller 30 runs a management layer, typically implemented in software, which manages the data storage in Flash devices 34. The management layer is referred to as Flash Translation Layer (FTL) or Flash management. As part of this management layer, processor 42 maintains one or more data structures, which store management information used in data storage in the Flash devices. The processor continuously updates the management information during operation of the SSD.

Processor 42 may maintain any suitable number and types of data structures, containing any suitable type of management information. One example type of data structure comprises a logical-to-physical address translation, which maps logical addresses (also referred to as Logical Block Addresses—LBAs) specified by the host into respective physical storage locations in Flash devices 34.

In another example, the data structure may comprise a database of parameters of memory blocks of Flash devices 34, e.g., usage information of the memory blocks, block status, and/or storage parameters used for data programming and readout in the memory blocks.

In the description that follows, processor 42 maintains two data structures—a logical-to-physical address translation table (also referred to as Virtual-to-Physical mapping—V2P) and a Block Database (BDB). At least part of the V2P and BDB is stored in RAM 50. It is important to protect the management information stored in RAM 50 against power interruption, in order to avoid loss of management information. In many practical cases, loss of management information may cause severe damage to large amounts of stored data.

Robust Journaling Scheme

Figure 2:
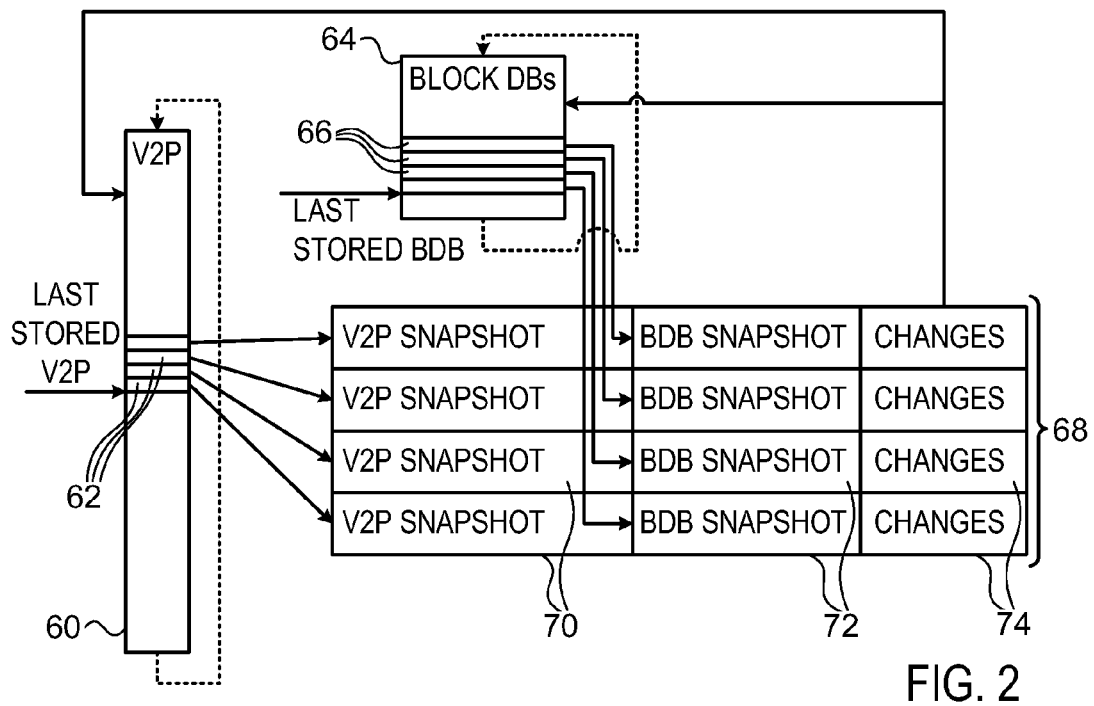
FIG. 2 is a diagram that schematically illustrates a database journaling scheme, in accordance with an embodiment of the present invention.

FIG. 2 is a diagram that schematically illustrates a database journaling scheme, in accordance with an embodiment of the present invention. The present example shows a V2P table 60 and a BDB 64. Processor 42 divides V2P table 60 into multiple slices 62, and divides BDB 64 into multiple slices 66. The slices of a given data structure are typically of uniform size.

In order to back-up the V2P table and the BDB to Flash devices 34, processor 42 creates a sequence of journaling chunks 68 during operation of the SSD. Each journaling chunk 68 comprises a V2P snapshot field 70 for storing a respective slice 62 of V2P table 60, a BDB snapshot field 72 for storing a respective slice 66 of BDB 64, and a changes field 74 for storing the changes that occurred in the V2P table and in the BDB since the previous journaling chunk 68. In an embodiment, each chunk comprises indications that point to the locations in the V2P table and in the BDB from which the respective slices were obtained.

Typically, processor 42 stores each journaling chunk 68 in Flash devices 34 as soon as the changes field 74 of the chunk fills-up. In other words, processor 42 continually updates changes field 74 of the current chunk with the changes that are made in the V2P table and in the BDB. When the changes field is full, i.e., when the accumulated changes reach the size of field 74, processor 42 writes the journaling chunk to Flash devices 34.

In this mode of operation, the rate of storing the chunks is variable and depends on the level of variability of the data structures. During idle times, the changes accumulate slowly and field 74 fills-up after a relatively long time period. During intensive storage activity, changes accumulate quickly, field 74 fills-up quickly, and therefore the rate of writing chunks to the Flash devices increases.

Typically, processor 42 scans V2P table 60 and BDB 64 cyclically, slice by slice. After storing the last slice of a given data structure in a chunk 68, processor 42 typically wraps around and begins backing-up the first slice of the data structure again. Processor 42 holds pointers that track the locations of slices 62 and 66 that were most recently backed-up to the Flash devices. When reaching the end of a given data structure, the respective pointer wraps-around to the beginning of the data structure.

The memory space needed for storing chunks 68 should typically allow for storing a single instance of each data structure, plus additional memory space for storing the incremental changes. Typically, processor 42 tracks the locations in Flash devices 34 where the journaling chunks are stored. These locations are typically backed-up in the Flash devices, since they too may be lost in the event of power interruption.

It should be noted that in a given chunk 68, the changes in field 74 do not necessarily relate to the specific slices 62 and 66 that are stored in fields 70 and 72 of the same chunk. Generally, the changes stored in a given chunk may relate to any part of the data structures.

Writing a given slice (62 or 66) to chuck 68 is typically defined as an atomic operation. In other words, processor 42 typically does not allow any changes to the data structures during writing of a given slice. The changes stored in chunks 68 may comprise various types of changes. Generally, however, the changes are defined so as to enable reconstruction of the entire data structure based on the slices and the changes.

Figure 3:
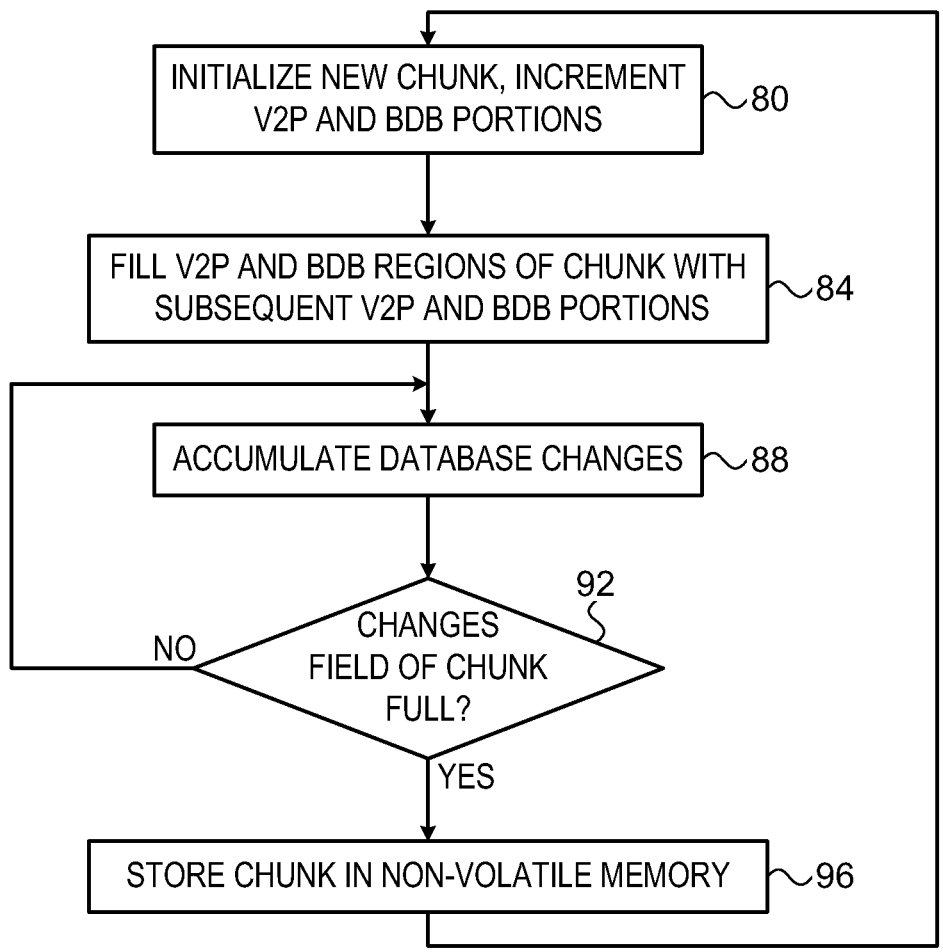
FIG. 3 is a flow chart that schematically illustrates a method for database journaling, in accordance with an embodiment of the present invention.

FIG. 3 is a flow chart that schematically illustrates a method for database journaling, in accordance with an embodiment of the present invention. The method begins with processor 42 of SSD controller 30 initializing a new chunk, and incrementing the cyclic pointers to point to the next slices 62 and 66 to be backed-up, at an initialization step 80.

Processor 42 populates the current chunk with the next data structure slices, at a chunk population step 84. In the present example, processor 42 copies the next V2P table slice 62 to field 70 of the current chunk, and copies the next BDB table slice 66 to field 72 of the current chunk.

Processor 42 begins to accumulate changes that are performed in the data structures (e.g., in the V2P mapping and in the BDB) during data storage in the SSD, at a change accumulation step 88. Processor 42 adds the new changes to changes field 74 of the currently created chunk 68. Processor 42 checks whether the changes field is full, at a checking step 84.

If the changes field is not yet full, the method loops back to step 88 above and processor 42 continues to accumulate V2P and BDB changes. If the changes field is full, processor 42 stores the current chunk 68 in Flash devices 34, at a chunk storage step 96. The method then loops back to step 80 above to initialize and start filling the next chunk.

The flow of FIG. 3 is an example flow that is chosen purely for the sake of clarity. In alternative embodiments, any other suitable flow of operations can be used.

Database Reconstruction Following Power Interruption

When recovering from an electrical power interruption, processor 42 reconstructs V2P table 60 and BDB 64 using the journaling chunks stored in Flash devices 34. In an example embodiment, processor 42 carries out the recovery process as follows (for a given data structure):

Processor 42 identifies the most recent chunk 68 written to the Flash devices. This chunk is referred to as the last chunk.

Using the known size of each data structure, processor 42 identifies the stored chunk 68 that holds the first valid slice of the data structure. This chunk is referred to as the first chunk.

Processor 42 reads the stored chunks from the Flash devices, from the above-identified first chunk to the above-identified last chunk.

For each read chunk, processor 42 copies the slice from the chunk to the appropriate location in RAM 50. Processor 42 then reviews the changes in the read chunk. If a given change relates to a slice that was already recovered to the RAM, processor 42 applies the specified change. Otherwise, the processor discards the change without applying it (the change should be accounted for by a later slice to be copied from a later chunk).

Following this process, processor 42 restores the various pointers to the data structures, and moves to normal runtime operation. From this point, processor 42 continues to back-up the data structures using the method of FIG. 3. If needed, a second recovery process can be performed using chunks that were stored before the first recovery. In other words, it is not necessary for processor 42 to perform a full baseline back-up of the data structure following recovery from power interruption.

Figure 4:
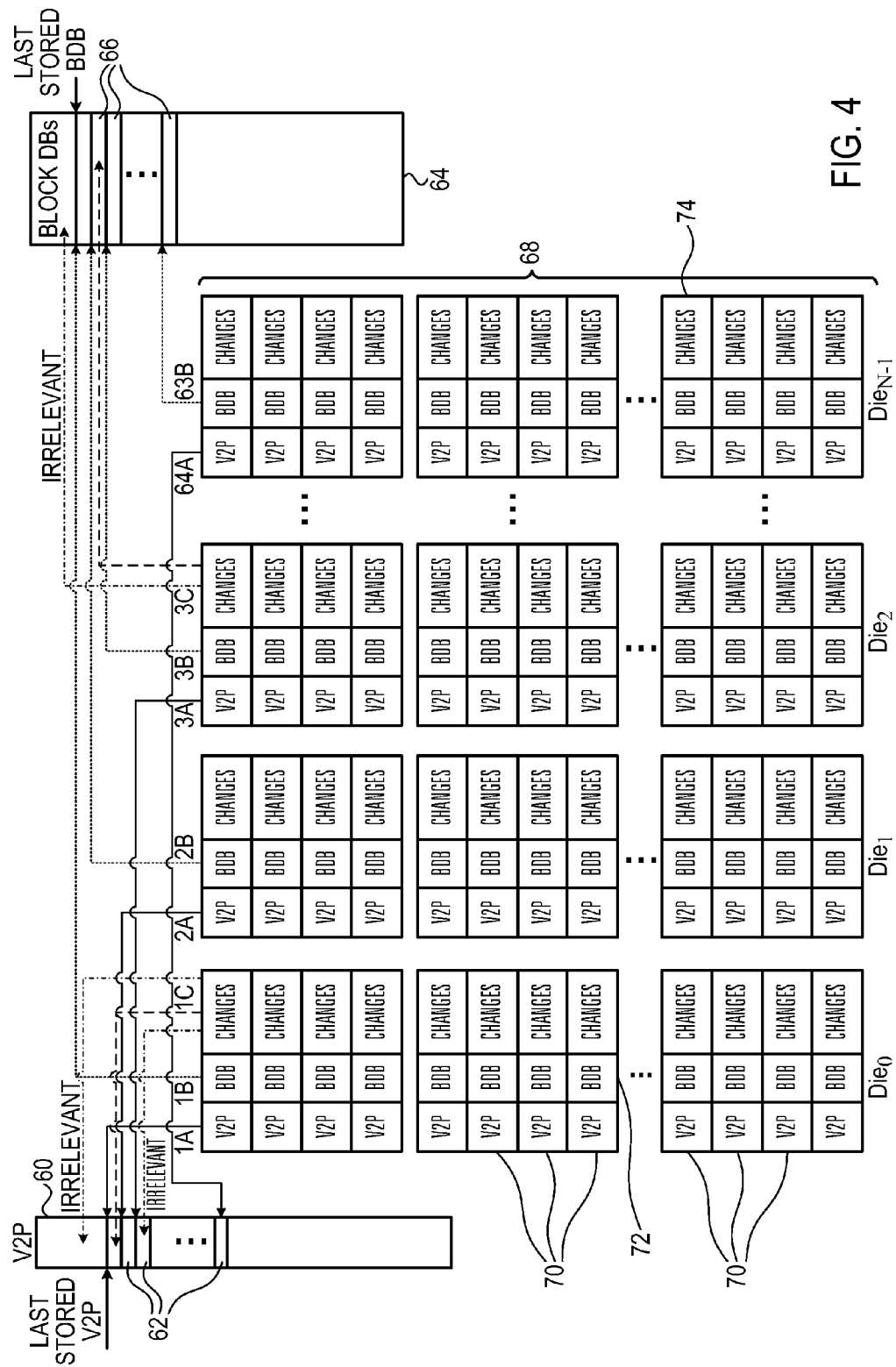
FIG. 4 is a diagram that schematically illustrates a database recovery scheme, in accordance with an embodiment of the present invention.

FIG. 4 is a diagram that schematically illustrates a database recovery scheme, in accordance with an embodiment of the present invention. The present example demonstrates several additional features of the disclosed techniques. In this example, multiple journaling chunks 68 are stored in parallel across N Flash dies, e.g., using multi-plane write commands. Recovery of the stored chunks can also be performed using multi-plane read commands. This sort of storage increases the speed of both back-up and recovery.

The arrows in FIG. 4 mark the process of copying the V2P and BDB slices from the journaling chunks to the V2P and BDB in RAM 50, and applying the changes specified in the chunks. Some of the arrows are marked "VALID", meaning that processor 42 applies the respective changes. Changes that are discarded by the processor, as explained above, are marked "IRRELEVANT".

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   in a storage device that includes a non-volatile memory and a volatile memory, maintaining at least one data structure that stores management information used for managing data storage in the non-volatile memory, such that at least a portion of the data structure is stored in the volatile memory;
   during operation of the storage device, creating a sequence of journaling chunks, each journaling chunk comprising a respective slice of the data structure and one or more changes that occurred in the data structure since a previous journaling chunk in the sequence;
   storing the sequence of the journaling chunks in the non-volatile memory; and
   upon recovering from an electrical power interruption in the storage device, reconstructing the data structure using the stored journaling chunks.

2. The method according to claim 1, wherein the data structure comprises a mapping of logical addresses to respective physical storage locations in the non-volatile memory.

3. The method according to claim 1, wherein the data structure comprises a database of parameters of respective memory blocks of the non-volatile memory.

4. The method according to claim 1, wherein creating the sequence of the journaling chunks comprises accumulating the changes, and, when the accumulated changes reach a predefined data size, storing the journaling chunk including the accumulated changes and the slice of the data structure.

5. The method according to claim 1, wherein creating the sequence of the journaling chunks comprises including in the changes stored in a given journaling chunk at least one change that does not relate to the slice of the data structure stored in the given journaling chunk.

6. The method according to claim 1, wherein creating the sequence of the journaling chunks comprises storing in successive journaling chunks respective successive slices that cyclically scan the data structure.

7. The method according to claim 1, wherein creating the sequence of the journaling chunks comprises storing in each journaling chunk an indication that points to a respective location in the data structure from which the respective slice was obtained.

8. The method according to claim 1, wherein the at least one data structure comprises multiple data structures, and wherein each journaling chunk comprises respective slices of the multiple data structures.

9. The method according to claim 1, wherein reconstructing the data structure comprises identifying a last journaling chunk that was written most recently to the non-volatile memory before the power interruption, identifying a first journaling chunk comprising a first valid slice of the data structure, and recovering the journaling chunks from the non-volatile memory, from the identified first journaling slice until the identified last journaling chunk.

10. The method according to claim 9, wherein recovering the journaling chunks comprises applying a given change read from a given journaling chunk only upon verifying that the slice referred to by the given change has been recovered already.

11. A storage device, comprising:
    a non-volatile memory;
    a volatile memory; and
    a processor, which is configured to maintain at least one data structure that stores management information used for managing data storage in the non-volatile memory, such that at least a portion of the data structure is stored in the volatile memory, to create, during operation of the storage device, a sequence of journaling chunks, each journaling chunk comprising a respective slice of the data structure and one or more changes that occurred in the data structure since a previous journaling chunk in the sequence, to store the sequence of the journaling chunks in the non-volatile memory, and, upon recovering from an electrical power interruption in the storage device, to reconstruct the data structure using the stored journaling chunks.

12. The storage device according to claim 11, wherein the data structure comprises a mapping of logical addresses to respective physical storage locations in the non-volatile memory.

13. The storage device according to claim 11, wherein the data structure comprises a database of parameters of respective memory blocks of the non-volatile memory.

14. The storage device according to claim 11, wherein the processor is configured to accumulate the changes, and, when the accumulated changes reach a predefined data size, to store the journaling chunk including the accumulated changes and the slice of the data structure.

15. The storage device according to claim 11, wherein the processor is configured to include in the changes stored in a given journaling chunk at least one change that does not relate to the slice of the data structure stored in the given journaling chunk.

16. The storage device according to claim 11, wherein the processor is configured to store in successive journaling chunks respective successive slices that cyclically scan the data structure.

17. The storage device according to claim 11, wherein the processor is configured to store in each journaling chunk an indication that points to a respective location in the data structure from which the respective slice was obtained.

18. The storage device according to claim 11, wherein the at least one data structure comprises multiple data structures, and wherein each journaling chunk comprises respective slices of the multiple data structures.

19. The storage device according to claim 11, wherein the processor is configured to reconstruct the data structure by identifying a last journaling chunk that was written most recently to the non-volatile memory before the power interruption, identifying a first journaling chunk comprising a first valid slice of the data structure, and recovering the journaling chunks from the non-volatile memory, from the identified first journaling slice until the identified last journaling chunk.

20. The storage device according to claim 19, wherein the processor is configured to apply a given change read from a given journaling chunk only upon verifying that the slice referred to by the given change has been recovered already.

\* \* \* \* \*